United States Patent
Hartman et al.

(10) Patent No.: US 7,708,024 B2
(45) Date of Patent: *May 4, 2010

(54) FIXED CONE SLEEVE VALVE HAVING RIBS DOWNSTREAM OF THE GATE FOR SUPPORTING THE CONE AND OTHER COMPONENTS OF THE VALVE

(76) Inventors: Thomas A. Hartman, 700 Capac Ct., St. Louis, MO (US) 63125; Brian T. Hartman, 2253 E. Contessa Cir., Mesa, AZ (US) 85213

( * ) Notice: Subject to any disclaimer, the term of this patent is extended or adjusted under 35 U.S.C. 154(b) by 0 days.

This patent is subject to a terminal disclaimer.

(21) Appl. No.: 12/174,419

(22) Filed: Jul. 16, 2008

(65) Prior Publication Data

US 2009/0032763 A1    Feb. 5, 2009

Related U.S. Application Data

(63) Continuation-in-part of application No. 11/450,010, filed on Jun. 9, 2006, now Pat. No. 7,493,912.

(51) Int. Cl.
*F16K 1/12* (2006.01)
(52) U.S. Cl. .................. 137/15.17; 251/127; 251/324; 251/326; 137/219; 137/545
(58) Field of Classification Search ............. 137/219, 137/15.01, 15.08, 15.17, 315.27, 315.29, 137/315.41, 220–222, 544, 545, 559; 251/324, 251/326, 127
See application file for complete search history.

(56) References Cited

U.S. PATENT DOCUMENTS

| 1,582,782 | A |   | 8/1923 | Price |
| 1,477,722 | A |   | 12/1923 | Slattery |
| 5,588,635 | A | * | 12/1996 | Hartman ..................... 251/127 |
| 5,950,660 | A |   | 9/1999 | Hartman |
| 6,296,009 | B1 |   | 10/2001 | Hartman |
| 7,493,912 | B2 | * | 2/2009 | Hartman et al. ............. 137/219 |

OTHER PUBLICATIONS

International Preliminary Report on Patentability for PCT/US2007/070622 dated Jun. 18, 2009.

* cited by examiner

*Primary Examiner*—Stephen Hepperle
*Assistant Examiner*—Craig M Schneider
(74) *Attorney, Agent, or Firm*—Thompson Coburn LLP; Clyde L. Smith

(57) ABSTRACT

A valve comprises a housing, a conduit, and a shut-off member, and a plurality of ribs. The conduit is fixed in position relative to the housing. The ribs are spaced from the conduit. The shut-off member is fixed in position within a cavity of the housing via the ribs. The gate has a fluid passageway extending therethrough and is movable relative to the shut-off member between opened and closed positions. The gate is able to linearly reciprocate between opened and closed positions along the center axis of the conduit. The gate is engaged with the shut-off member when the gate is in the closed position in a manner preventing fluid from flowing through the fluid passageway of the gate. The opened position of the gate allows fluid to flow through the fluid passageway of the gate.

18 Claims, 4 Drawing Sheets

FIXED CONE SLEEVE VALVE HAVING RIBS DOWNSTREAM OF THE GATE FOR SUPPORTING THE CONE AND OTHER COMPONENTS OF THE VALVE

CROSS-REFERENCE TO RELATED APPLICATIONS

This application is a continuation-in-part of U.S. patent application Ser. No. 11/450,010, entitled "Fixed Cone Sleeve Valve Having Cone Supported by Means Downstream of the Gate in its Closed Position", Filed Jun. 9, 2006, the entire disclosure of which is incorporated herein by reference.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention pertains generally to low head loss flow control valves. More particularly, the invention pertains to fixed cone sleeve valves having ribs downstream of the gate for supporting the cone, velocity diffusers, and velocity shredders.

2. General Background

Sleeve valves have been employed to control the flow rate and head pressure of fluids in industrial piping systems, hydro power facilities, agricultural facilities, water and sewage distribution systems, and industrial piping systems. Sleeve valves are often utilized for their ability to operate without the moving components of the valve having to work against the head pressure of the fluid being supplied to the valve. An example of a fixed cone sleeve valve is described in U.S. Pat. No. 6,296,009, entitled Arm-Driven Sleeve Valve With Centralized Drive Mechanism, which issued Oct. 2, 2001 and is hereby incorporated in its entirety by reference. Conventional arm-driven sleeve valves often comprise a tubular inlet conduit, a tubular gate, and a cone shaped shut-off member. It is common for the shut-off member to be rigidly attached to the inlet conduit via a plurality of ribs that extend into the fluid passageway of the inlet conduit. Other sleeve valves, such as is disclosed in U.S. Pat. No. 1,477,722, entitled Valve, which issued Dec. 18, 1923, and is hereby incorporated in its entirety by reference, comprise ribs downstream of the inlet conduit for supporting the shut-off member. The gate typically is linearly movable over the inlet conduit in a telescoping manner and in a manner such that it is able to engage against the shut-off member to prevent fluid from passing through the valve.

Although such fixed cone sleeve valves have proven to be highly useful, there are also problems related to such valves. One such problem with valves in which the shut-off member is rigidly attached to the inlet conduit via a plurality of ribs that extend into the fluid passageway of the inlet conduit is that the ribs that secure the shut-off member to the inlet conduit obstruct the fluid passageway within the inlet conduit, and thereby slightly restrict the flow through the valve. As can be appreciated, this lowers the overall efficiency of the valve. Even in sleeve valves in which the ribs downstream of the inlet conduit support the shut-off member, the flow downstream of the inlet conduit is non-linear and can cause non-uniform pressure differentials that can cold work or work harden the housing and ribs of such valves. Cold working the housing and ribs can cause the housing and ribs to become brittle and fracture due to fatigue. Moreover, velocity differentials of the fluid flow downstream of the inlet conduit can cause significant drag on the fluid as it passes through a sleeve valve.

SUMMARY OF THE INVENTION

The present invention overcomes many of the disadvantages associated with prior art fixed cone sleeve valves. A sleeve valve in accordance with the present invention comprises ribs downstream of the inlet conduit for supporting the shut-off member. The ribs preferably also support a plurality of velocity diffusers and a velocity shredder that reduce the problems associated with pressure differentials and redistribute the flow downstream of the inlet conduit in a manner resulting in more uniform flow downstream of the inlet conduit. Despite the presence of the velocity diffusers and velocity shredder in the sleeve valve, due to the ability to easily detach at least part of one of the velocity diffusers from the ribs, debris remains easy to remove from the housing of the valve. Moreover, the presence of the velocity diffusers and velocity shredder increases the efficiency of the value.

In one aspect of the invention, a valve comprises a housing, a conduit, a plurality of ribs, a shut-off member, a gate, and a velocity diffuser. The housing has a cavity. The conduit has a fluid passageway extending therethrough and is fixed in position relative to the housing. The ribs are spaced from the conduit. The shut-off member is fixed in position within the cavity of the housing via the ribs. The gate has a fluid passageway extending therethrough and is movable relative to the shut-off member between opened and closed positions. At least a portion of the conduit is slidably received within the fluid passageway of the gate. The fluid passageway of the conduit is in fluid communication with the fluid passageway of the gate when the gate is in the opened position and when the gate is in the closed position. The gate is engaged with the shut-off member when the gate is in the closed position in a manner preventing fluid from flowing through the fluid passageway of the gate. The opened position of the gate allows fluid to flow through the fluid passageway of the gate. The velocity diffuser is fixed in position within the cavity of the housing via the ribs. The velocity diffuser comprises at least one wall member that has a plurality of openings extending therethrough. The wall is removably attached to the ribs in a manner allowing at least a portion of the cavity of the housing to be accessed for maintenance.

In another aspect of the invention, a valve comprises a housing, a conduit, a plurality of ribs, a shut-off member, a gate, a first conical velocity diffuser, and a second conical diffuser. The housing has a cavity. The conduit has a fluid passageway extending therethrough and is fixed in position relative to the housing. The ribs are spaced from the conduit. The shut-off member is fixed in position within the cavity of the housing via the ribs. The gate has a fluid passageway extending therethrough and is movable relative to the shut-off member between opened and closed positions. At least a portion of the conduit is slidably received within the fluid passageway of the gate. The fluid passageway of the gate has a center axis along which the gate linearly reciprocates between opened and closed positions. The fluid passageway of the conduit is in fluid communication with the fluid passageway of the gate when the gate is in the opened position and when the gate is in the closed position. The gate is engaged with the shut-off member when the gate is in the closed position in a manner preventing fluid from flowing through the fluid passageway of the gate. The opened position of the gate allows fluid to flow through the fluid passageway of the gate. The first conical velocity diffuser is fixed in position within the cavity of the housing via the ribs. The first conical velocity diffuser is aligned with the center axis and comprises at least one wall member having a plurality of openings extending therethrough. The first conical velocity diffuser diverges radially away from the center axis as the first conical velocity diffuser extends in a first direction along the center axis. The second conical velocity diffuser is fixed in position within the cavity of the housing via the ribs. The second conical velocity diffuser is aligned with the center axis and comprises at least one wall member having a plurality of openings extending therethrough. The second conical velocity diffuser converges radially toward the center axis as the second conical velocity diffuser extends in the first direction.

In another aspect of the invention, a method comprises a step of partially assembling a valve. The valve comprises a housing, a conduit, and a shut-off member, and a plurality of ribs. The housing has a cavity. The conduit has a fluid passageway extending therethrough and is fixed in position relative to the housing. The fluid passageway of the conduit has a center axis. The ribs are spaced from the conduit and are circumferentially spaced from each other about the center axis. Each of the ribs has an innermost edge nearest the center axis. The innermost edge of each of the ribs diverges away from the center axis as such rib extends a first direction along the center axis. The shut-off member is fixed in position within the cavity of the housing via the ribs. The gate has a fluid passageway extending therethrough and is movable relative to the shut-off member between opened and closed positions. At least a portion of the conduit is slidably received within the fluid passageway of the gate. The gate is able to linearly reciprocate between opened and closed positions along the center axis. The fluid passageway of the conduit is in fluid communication with the fluid passageway of the gate when the gate is in the opened position and when the gate is in the closed position. The gate is engaged with the shut-off member when the gate is in the closed position in a manner preventing fluid from flowing through the fluid passageway of the gate. The opened position of the gate allows fluid to flow through the fluid passageway of the gate. The method further comprises a step of driving a wedge member between the innermost edges of the ribs in a second direction. The second direction being opposite the first direction. The driving of the wedge member radially compresses the ribs against the housing.

In another aspect of the invention, a method of removing debris from a valve comprises a step of accessing a valve. The valve comprising a housing, a conduit, a plurality of ribs, a shut-off member, a gate, and a velocity diffuser. The housing has a cavity. The conduit has a fluid passageway extending therethrough and is fixed in position relative to the housing. The ribs are spaced from the conduit. The shut-off member is fixed in position within the cavity of the housing via the ribs. The gate has a fluid passageway extending therethrough and is movable relative to the shut-off member between opened and closed positions. At least a portion of the conduit is slidably received within the fluid passageway of the gate. The fluid passageway of the conduit is in fluid communication with the fluid passageway of the gate when the gate is in the opened position and when the gate is in the closed position. The gate is engaged with the shut-off member when the gate is in the closed position in a manner preventing fluid from flowing through the fluid passageway of the gate. The opened position of the gate allows fluid to flow through the fluid passageway of the gate. The velocity diffuser is fixed in position within the cavity of the housing via at least some of the ribs. The velocity diffuser comprises at least one wall member having a plurality of openings extending therethrough. The wall member is attached to at least two of the ribs. The method further comprises detaching the wall member of the velocity diffuser from the at least two of the ribs of the valve to access a portion of the cavity of the housing and removing debris from the portion of the cavity while the wall member of the velocity diffuser is detached from the at least two of the ribs. Still further, the method comprises reattaching the wall member of the velocity diffuser to the at least two of the ribs of the valve after the debris has been removed from the portion of the cavity of the housing.

Further features and advantages of the present invention, as well as the operation of various embodiments of the present invention, are described in detail below with reference to the accompanying drawings.

Figure 1:
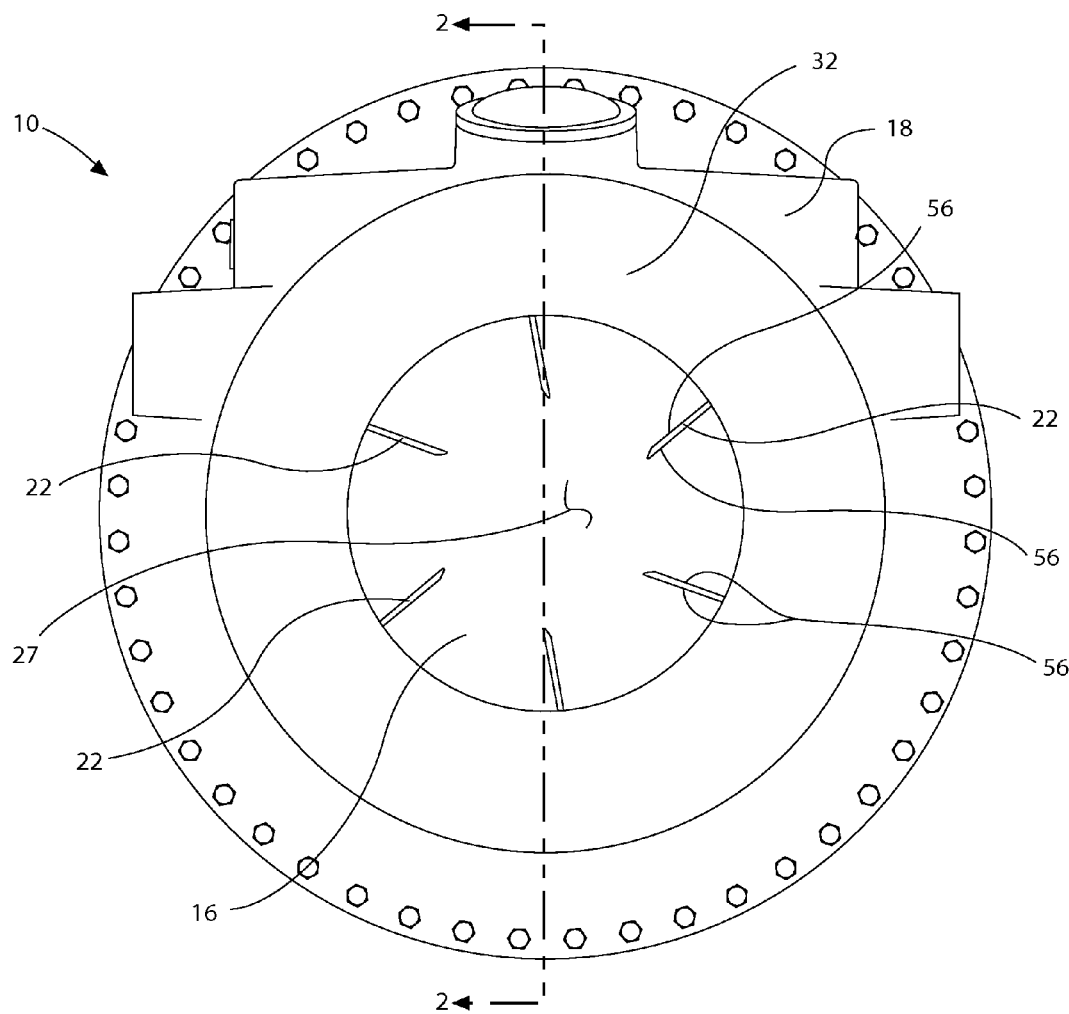
FIG. 1 is a front view of a valve in accordance with the invention.

Reference numerals in the written specification and in the drawing figures indicate corresponding items.

DETAILED DESCRIPTION OF THE PREFERRED EMBODIMENTS

A preferred embodiment of a valve in accordance with the invention is shown in FIGS. 1-4 and is referenced herein by the numeral 10. The valve 10 preferably comprises a conduit 12, a gate 14, a shut-off member 16, a housing 18, a plurality of ribs 20, a plurality of guide members 22, an actuation mechanism 23, a first velocity diffuser 24, a second velocity diffuser 25, and a velocity shredder 26.

The conduit 12 comprises a fluid passageway 27 that preferably serves as an inlet for fluid into the valve 10. Preferably the fluid passageway 27 of the conduit 12 is generally cylindrical as it approaches the downstream end 28 of the conduit. Similarly, the exterior surface 30 of the conduit 12 is preferably cylindrical as it approaches the downstream end 28 of the conduit. The upstream end of the conduit 12 may comprise a flared opening 32 (as shown) which can be in direct communication with a body of water, or may be attached to some other conduit (not shown) that delivers fluid to the valve 10.

The gate 14 preferably is in the form of a generally cylindrical tube that comprises a fluid passageway 34 that extends between opposite upstream 36 and downstream ends 38 of the gate. The gate 14 is preferably slidably connected to the downstream end 28 of the conduit 12 in a manner such that the interior surface 40 of the gate engages the exterior surface 30 of the conduit and such that the gate can linearly slide back and forth along its center axis relative to the conduit. The engagement between the interior surface 40 of the gate 14 and the exterior surface 30 of the conduit 12 preferably forms an annular watertight seal that prevents water from passing between such surfaces.

The shut-off member 16 preferably has a generally conical upstream surface 42 that includes an annular sealing portion 44. The conical shape of the upstream surface 42 provides the shut-off member 16 with a rigidity sufficient to withstand pressure heads of one thousand feet of water or more with minimal deflection, and facilitates the relatively smooth channeling of water through the valve 10.

The housing 18 preferably comprises an interior cavity 46 that includes a generally cylindrical portion that forms a downstream fluid passageway 48 which allows fluid to be discharged from the valve 10. The gate 14 and the shut-off member 16 are preferably positioned within the interior cavity 46 of the housing 18. Additionally, the housing 18 is preferably rigidly connected to the conduit 12 upstream of the gate 14.

There are preferably six ribs 20 formed from plate steel that are positioned within the interior cavity 46 of the housing 18. Preferably, the ribs 20 extend generally radially outward relative to the center axis defined by the gate 14 and conduit 12. The ribs 20 are preferably evenly spaced circumferentially about the center axis of the gate 14 and are preferably welded to the housing 18 and to the shut-off member 16, thereby rigidly fixing the shut-off member in position relative to the conduit 12. Each of the ribs 20 preferably has a innermost edge 49 that diverges away from the center axis as the rib extends downstream. A large notch 50 preferably extends through the upstream edge 52 of each rib 20. As shown in the drawing figures, portions of the upstream edges 52 of ribs 20 preferably include one-sided bevels 54 that are configured to prevent the ribs from fluttering during fluid flow by inducing an out of plane force on the upstream edges of the ribs. The notch 50 of each of the ribs preferably includes a receiving edge 55 that is generally parallel to the center axis of the gate 14. Preferably, half of the ribs 20A have a downstream edge of one configuration while the other half of the ribs 20B have downstream edge of another configuration (as shown).

The guide members 22 are also each preferably formed out of plate steel and preferably are welded to and extend from the upstream surface 42 of the shut-off member 16. Preferably, the opposite planar surfaces 56 of each guide member 22 are oriented parallel to the center axis defined by the gate 14, but are also angled from being parallel to the radial direction of the center axis. The guide members 22 each have a leading or upstream edge 58 and a contact edge 60. The upstream edges 58 of the guide members 22 slope in a general downstream direction as they extend radially away from the center axis defined by the gate 14. The contact edges 60 of the guide members 22 are preferably radially positioned from the center axis by distance such that guide members are able to slidably engage with the interior surface 40 of the gate 14.

The actuation mechanism 23 comprises a shaft 62 and pair of swing arms 64. The swing arms 64 may be separate as shown or may be part of a wishbone configuration as disclosed in U.S. Pat. No. 6,296,009, which is herein incorporated by reference in its entirety. The swing arms 64 are rotational fixed to the shaft 62 and shaft is pivotally connected to the housing 18. The swing arms are also pivotally and connected to the gate 14. The actuation mechanism 23 is preferably a conventional actuation mechanism of the type wherein shaft 62 is driven to pivot about its axis relative to the housing 18 in a manner causing the swing arms 64 to swing about the shaft's axis and to thereby move the gate 14 linearly back and forth.

The first velocity diffuser 24 and the second velocity diffuser 25 each comprise a wall 66 that has a plurality of openings 68 that extend through the wall. The wall 66 preferably conical in shape. The first velocity diffuser 24 is preferably aligned with the center axis of the gate 14 and converges away from the center axis as the diffuser extends downstream along the center axis. The second velocity diffuser 25 is also preferably aligned with the center axis of the gate 14, but diverges toward the center axis as the diffuser extends downstream along the center axis. The second velocity diffuser 25 is larger in size than the first velocity diffuser 24 and is positioned relative to the first velocity diffuser in a manner such that it will deflect fluid toward the first velocity diffuser at an angle that is more perpendicular than the fluid is parallel to the wall of the first velocity diffuser. The first velocity diffuser 24 and the second velocity diffuser 25 are each preferably bolted to at least some of the ribs 20 of the valve 10, thereby allowing the them to be relatively easily detached from the ribs. Preferably the second velocity diffuser 25 is attached to each of the ribs 20 while the first velocity diffuser is attached to only half of the ribs 20A. Although they are preferably each a single piece, it should be appreciated that the first velocity diffuser 24 and the second velocity diffuser 25 could each be formed of multiple pieces.

The velocity shredder 26 preferably comprises a cylindrical wall 70. the cylindrical wall 70 preferably comprises a plurality of openings 72. The velocity shredder 26 is preferably positioned between the inlet conduit 12 and the first and second velocity diffusers 24, 25. Preferably, the velocity shredder 26 is aligned with the center axis of the gate 14 and is supported in the interior cavity 46 of the housing 18 via the ribs 20. More specifically, the velocity shredder 26 is preferably held in place by vibration absorbing pads of, for example, rubber or polymeric material (not shown) that are attached to the receiving edges 55 of the ribs 20. This reduces the transfer of vibration from the velocity shredder 26 and into the ribs 20, and ultimately the housing 18.

During the assembly of the valve 10, a wedge 74 is preferably utilized to radially compress and hold the ribs 20 against the housing 18. The wedge 74 is preferably a ring that is tapered to generally match the slope of the innermost edges 49 of the ribs 20. Preferably, a plurality of slots 76 circumferentially spaced around the wedge 74 for receiving the innermost edges 49 of the ribs 20. When compressing the ribs 20 against the housing 18 the wedge is driven in the upstream direction by a sledgehammer or by other methods. Due to the divergent configuration of the innermost edges 49 of the ribs 20, this forces the ribs 20 with an increasing force as the wedge 74 slides upstream relative to the ribs 20. Once the ribs 20 are adequately compressed against the housing 18, the ribs are preferably welded to the housing 18 and to the wedge 74.

Figure 2:
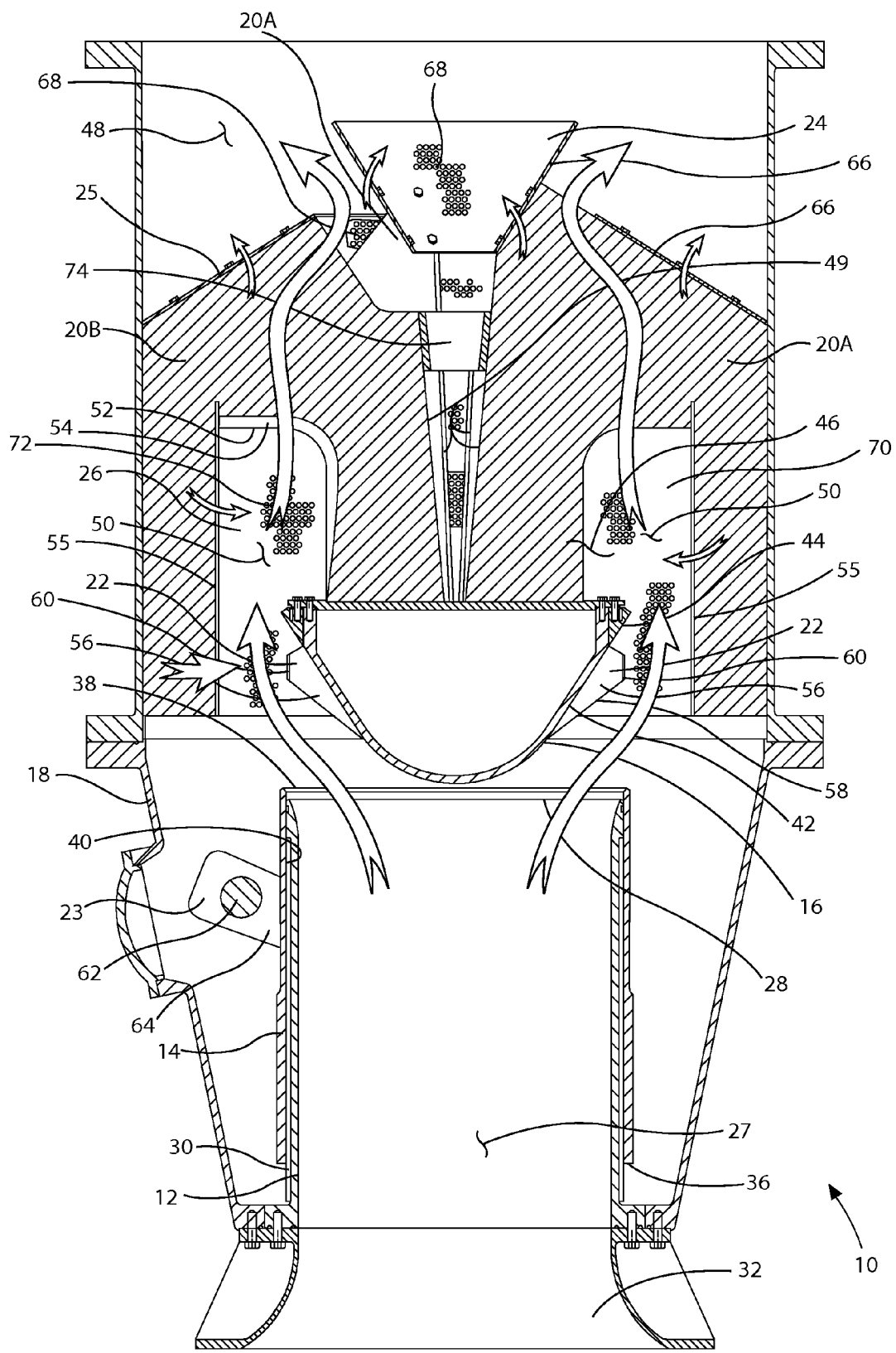
FIG. 2 is a cross-sectional view of the valve shown in FIG. 1, taken about the line 2-2 shown in FIG. 1 and is shown with the gate in the opened position.

In operation, the gate 14 of the valve 10 can be moved, via the actuation mechanism 23, linearly back forth relative to the conduit 12 and the shut-off member 16 between an opened position, as is shown in FIG. 1, and a closed position, as shown in FIG. 2. In the opened position, the gate 14 is disengaged from the shut-off member 16 and fluid within the fluid passageway 27 of the conduit 12 is free to pass into the downstream fluid passageway 48 of the housing 18. Assuming that there is a pressure differential across the valve 10, fluid will flow from the fluid passageway 27 of the conduit 12 into the downstream fluid passageway 48 of the housing 18 and ultimately out of the valve.

When the fluid stream deflects off of the shut-off member 16, it passes against the velocity shredder 26. It should be appreciated that the fluid stream has a relatively high velocity, and therefore low pressure, as it deflects off of the shut-off member 16. The openings 72 of the velocity shredder 26 allow higher pressure fluid around the exterior of the velocity shredder to pass radially inward through the wall of the velocity shredder and thereby reduce the pressure differential across the wall 70 of the velocity shredder. This effectively prevents the fluid stream from creating an excessively large pressure differential across any of the components of the valve 10 and thereby increases the fatigue life of the valve.

After passing downstream of the velocity shredder 26, the fluid stream passes through the gaps between the ribs 20. It should be appreciated that the downstream fluid passageway 48 of the housing 18 has a cross sectional area that is significantly larger than does the fluid passageway 27 of the conduit 12. As such, the presence of the ribs 20 in the downstream fluid passageway 48 of the housing 18 does not act as a restrictor on the flow of fluid through the valve 10. In contrast, the presence of ribs joining the shut-off member 16 directly to the conduit 12 within the fluid passageways 27, 34 of the conduit 12 or the gate 14, as is common in prior art valves, does, in most cases, restrict fluid flow through the valve. It should also be appreciated that the absence of ribs joining the shut-off member 16 directly to the conduit 12 eliminates the possibility of debris becoming entangled on such ribs and thereafter obstructing the operation of the valve by preventing the closure of the gate 14.

Further downstream, the fluid stream is deflected radially inward by the second velocity diffuser 25. However, it should be appreciated that some of the fluid stream passes through openings 68 of the second velocity diffuser 25 and some avoids it altogether. Nonetheless, much of fluid stream is redirected by the second velocity diffuser 25 to flow against the first velocity diffuser 24. The first velocity diffuser 24 then redirects the fluid stream radially outward. Again, it should be appreciated that some of the fluid steam passes through the openings 68 of the first velocity diffuser 24. After flowing past the first velocity diffuser 24, the fluid stream quickly becomes relatively uniform (at least to the extent it would be when if flowing through a long smooth pipe), much more so than it would become absent the velocity diffusers. This reduces the drag created by the valve 10 and therefore increases the efficiency of the valve.

When the gate 14 is in the closed position, the downstream end 38 of the gate engages with the annular sealing portion 44 of the shut-off member 16 and thereby prevents fluid communication between the fluid passageway 27 of the conduit 12 and the downstream fluid passageway 48 of the housing 18. Thus, with the gate 14 in the closed position, fluid is not able to pass through the valve 10. It should be appreciated that when the valve is closed, a large pressure differential of several hundred pound per square inch may exist between the fluid passageway 27 of the conduit 12 and the interior cavity 46 of the housing 18, and that the absence of ribs joining the shut-off member 16 directly to the conduit allows the conduit to expand circumferentially under such stress in an even manner. Thus, the lack of ribs joining the conduit to the shut-off member eliminates unwelcome stress risers that would otherwise fatigue the conduit and the connection between the conduit and the ribs.

Figure 3:
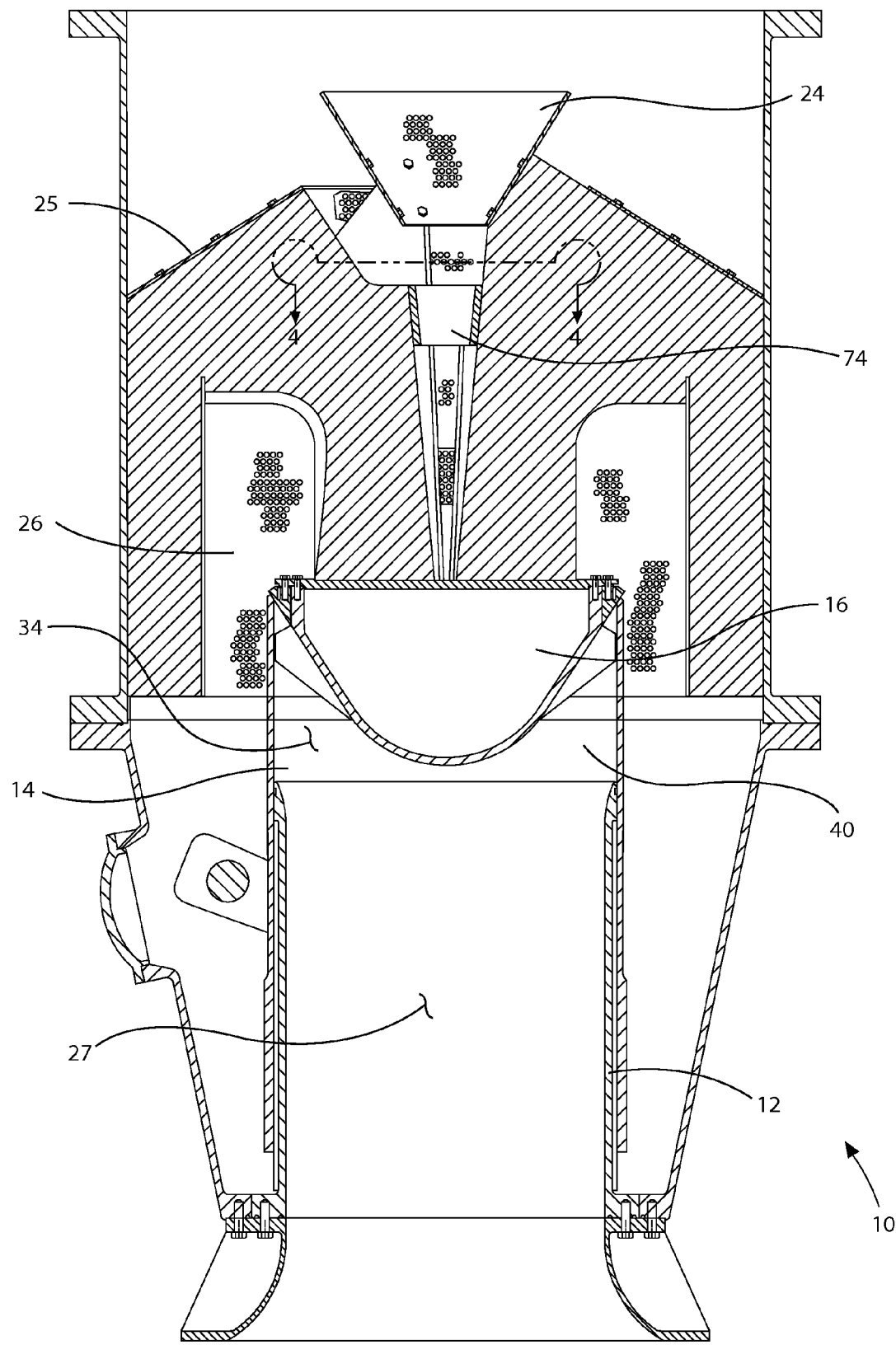
FIG. 3 is a cross-sectional view similar to FIG. 2, but is shown with the gate in the closed position.
Figure 4:
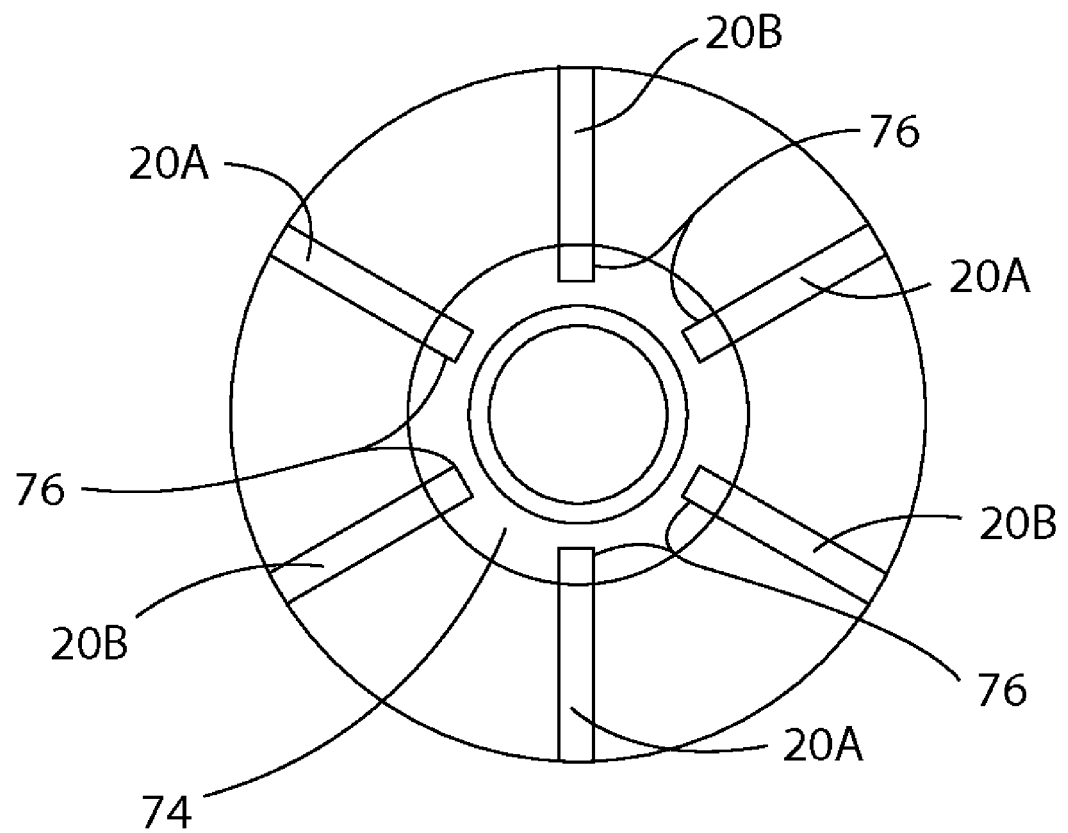
FIG. 4 rear detail view of the wedge member and ribs of the valve shown in FIGS. 1-3, as seen from the line 4-4 of FIG. 3.

As the gate 14 initially moves away from the closed position, the guide members 22 maintain engagement with the interior surface 40 of the gate until the gate reaches an intermediate position, which is shown in FIG. 3. After the gate 14 reaches the intermediate position, further movement of the gate away from the closed position separates the gate from the guide members 22. By engaging the gate 14 when the valve 10 is only partially opened, the guide members 22 radially stabilize the gate and prevent harmful radial oscillation of the gate that could otherwise occur as a result of nonuniform flow passing through a relative narrow opening between the downstream end 38 of the gate and the shut-off member 16. It should also be appreciated that when the gate 14 is between the intermediate position and the opened position, the downstream end 38 of the gate is spaced from the shut-off member 16 by a distance that is large enough to avoid creating such oscillation. Still further, it should be appreciated that when the gate 14 is between the closed position and the intermediate position, there is the possibility that debris may become entangled on the guide members 22 since all of the flow passing through the valve 10 must then pass between the guide members. However, any such debris can be automatically dislodged from guide members 22 by moving the gate toward the opened position sufficiently beyond the intermediate position. The sloped nature of the upstream edges 58 of the guide members 22 facilitates this automatic dislodging of debris.

The configuration of the valve 10 allows most debris passing through the valve to pass between the space that separates the first velocity diffuser 24 from the second velocity diffuser 25. However, large debris may become trapped upstream of the velocity diffusers 24, 25. To remove such debris, the valve can be closed and then one of both of the velocity diffusers 24, 25 can be unbolted and detached from the ribs 20, thereby allowing access to the interior cavity 46 of the housing 18 that lies upstream of velocity diffusers. After the debris has been removed, the velocity diffuser(s) 24, 25 can simply be re-bolted to the ribs 20. Thus, it should be appreciated that no separate cleanout portal is required in the housing 18 for such purposes.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of the preferred embodiment of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed.

What is claimed is:

1. A method comprising:
  partially assembling a valve, the valve comprising a housing, a conduit, and a shut-off member, and a plurality of ribs, the housing having a cavity, the conduit having a fluid passageway extending therethrough and being fixed in position relative to the housing, the fluid passageway of the conduit having a center axis, the ribs being spaced from the conduit and circumferentially spaced from each other about the center axis, each of the ribs having an innermost edge nearest the center axis, the innermost edge of each of the ribs diverging away from the center axis as such rib extends a first direction along the center axis, the shut-off member being fixed in position within the cavity of the housing via the ribs, the gate having a fluid passageway extending therethrough and being movable relative to the shut-off member between opened and closed positions, at least a portion of the conduit being slidably received within the fluid passageway of the gate, the gate be able to linearly reciprocate between opened and closed positions along the center axis, the fluid passageway of the conduit being in fluid communication with the fluid passageway of the gate when the gate is in the opened position and when the gate is in the closed position, the gate being engaged with the shut-off member when the gate is in the closed position in a manner preventing fluid from flowing through the fluid passageway of the gate, the opened position of the gate allowing fluid to flow through the fluid passageway of the gate; and driving a wedge member between the innermost edges of the ribs in a second direction, the second direction being opposite the first direction, the driving of the wedge member radially compressing the ribs against the housing.

2. A method in accordance with claim 1 further comprising:
welding the wedge member to each of the ribs after the step of driving the wedge member.

3. A method in accordance with claim 1 further comprising:
attaching a velocity diffuser to at least some of the ribs in a manner such that such ribs support the velocity diffuser within the cavity of the housing, the velocity diffuser comprising at least one wall member having a plurality of openings extending therethrough.

4. A method in accordance with claim 3 wherein the velocity diffuser is a first conical velocity diffuser that is aligned with the center axis and diverges radially away from the center axis as the first velocity diffuser extends in a first direction along the center axis, and further comprising:
attaching a second conical velocity diffuser to at least some of the ribs in a manner such that such ribs support the second conical velocity diffuser within the cavity of the housing being fixed in position within the cavity of the housing via the ribs, the second conical velocity diffuser being aligned with the center axis and comprising at least one wall member having a plurality of openings extending therethrough, the second velocity diffuser converging radially toward the center axis as the second velocity diffuser extends in the first direction.

5. A method in accordance with claim 4 further comprising:
attaching a velocity shredder to at least some of the ribs in a manner such that such ribs support the velocity shredder within the cavity of the housing, the velocity shredder comprising at least one wall member having a plurality of openings extending therethrough.

6. A method in accordance with claim 1 further comprising:
attaching a velocity shredder to at least some of the ribs in a manner such that the ribs support the velocity shredder within the cavity of the housing, the velocity shredder comprising at least one wall member having a plurality of openings extending therethrough.

7. A method of removing debris from a valve, a method comprising:
accessing a valve, the valve comprising a housing, a conduit, a plurality of ribs, a shut-off member, a gate, and a velocity diffuser, the housing having a cavity, the conduit having a fluid passageway extending therethrough and being fixed in position relative to the housing, the ribs being spaced from the conduit, the shut-off member being fixed in position within the cavity of the housing via the ribs, the gate having a fluid passageway extending therethrough and being movable relative to the shut-off member between opened and closed positions, at least a portion of the conduit being slidably received within the fluid passageway of the gate, the fluid passageway of the conduit being in fluid communication with the fluid passageway of the gate when the gate is in the opened position and when the gate is in the closed position, the gate being engaged with the shut-off member when the gate is in the closed position in a manner preventing fluid from flowing through the fluid passageway of the gate, the opened position of the gate allowing fluid to flow through the fluid passageway of the gate, the velocity diffuser being fixed in position within the cavity of the housing via at least some of the ribs, the velocity diffuser comprising at least one wall member having a plurality of openings extending therethrough, the wall member being attached to at least two of the ribs;

detaching the wall member of the velocity diffuser from the at least two of the ribs of the valve to access a portion of the cavity of the housing and removing debris from the portion of the cavity while the wall member of the velocity diffuser is detached from the at least two of the ribs;

reattaching the wall member of the velocity diffuser to the at least two of the ribs of the valve after the debris has been removed from the portion of the cavity of the housing.

8. A method in accordance with claim 7 wherein the velocity diffuser is a first conical velocity diffuser that is aligned with the center axis and diverges radially away from the center axis as the first conical velocity diffuser extends in a first direction along the center axis, the valve comprises a second conical velocity diffuser that is fixed in position within the cavity of the housing via at least some of the ribs, the second conical velocity diffuser comprises at least one wall member having a plurality of openings extending therethrough, the second conical velocity diffuser is aligned with the center axis and comprising at least one wall member having a plurality of openings extending therethrough, the second velocity diffuser converges radially toward the center axis as the second velocity diffuser extends in the first direction, and the second conical velocity diffuser remains attached to the at least some of the ribs when the debris is being removed from the portion of the cavity.

9. A method in accordance with claim 7 wherein the valve comprises threaded bolts that attach wall member of the velocity diffuser to the at least two ribs, and the step of detaching the wall member of the velocity diffuser from the at least two ribs comprises loosening the threaded bolts.

10. A valve comprising:
a housing, the housing having a cavity;
a conduit, the conduit having a fluid passageway extending therethrough and being fixed in position relative to the housing;
a plurality of ribs, the ribs being spaced from the conduit;
a shut-off member, the shut-off member being fixed in position within the cavity of the housing via the ribs;
a gate, the gate having a fluid passageway extending therethrough and being movable relative to the shut-off member between opened and closed positions, at least a portion of the conduit being slidably received within the fluid passageway of the gate, the fluid passageway of the conduit being in fluid communication with the fluid passageway of the gate when the gate is in the opened position and when the gate is in the closed position, the gate being engaged with the shut-off member when the gate is in the closed position in a manner preventing fluid from flowing through the fluid passageway of the gate, the opened position of the gate allowing fluid to flow through the fluid passageway of the gate; and a velocity diffuser being fixed in position within the cavity of the housing via the ribs, the velocity diffuser comprising at least one wall member having a plurality of openings extending therethrough, the wall being removably attached to the ribs in a manner allowing at least a portion of the cavity of the housing to be accessed for maintenance.

11. A valve in accordance with claim 10 wherein the fluid passageway of the gate has a center axis along which the gate linearly reciprocates between opened and closed positions, and the velocity diffuser is conical and is aligned with the center axis.

12. A valve in accordance with claim 11 wherein the velocity diffuser constitutes a first velocity diffuser, the first velocity diffuser diverges radially away from the center axis as the first velocity diffuser extends in a first direction along the center axis, the valve further comprises a second velocity diffuser that is fixed in position within the cavity of the housing and relative to the housing via the ribs, the second velocity diffuser comprises at least one wall member that has a plurality of openings extending therethrough, the second velocity diffuser is conical and is aligned with the center axis, and the second velocity diffuser converges radially toward the center axis as the second velocity diffuser extends in the first direction.

13. A valve in accordance with claim 12 wherein the valve further comprises a velocity shredder that that is positioned within the cavity of the housing between the conduit and the first and second velocity diffusers, and the velocity shredder comprises at least one wall member that has a plurality of openings extending therethrough.

14. A valve in accordance with claim 13 wherein the velocity shredder is cylindrical and is aligned with the center axis.

15. A valve comprising:

a housing, the housing having a cavity;

a conduit, the conduit having a fluid passageway extending therethrough and being fixed in position relative to the housing;

a plurality of ribs, the ribs being spaced from the conduit;

a shut-off member, the shut-off member being fixed in position within the cavity of the housing via the ribs;

a gate, the gate having a fluid passageway extending therethrough and being movable relative to the shut-off member between opened and closed positions, at least a portion of the conduit being slidably received within the fluid passageway of the gate, the fluid passageway of the gate having a center axis along which the gate linearly reciprocates between opened and closed positions, the fluid passageway of the conduit being in fluid communication with the fluid passageway of the gate when the gate is in the opened position and when the gate is in the closed position, the gate being engaged with the shut-off member when the gate is in the closed position in a manner preventing fluid from flowing through the fluid passageway of the gate, the opened position of the gate allowing fluid to flow through the fluid passageway of the gate;

a first conical velocity diffuser being fixed in position within the cavity of the housing via the ribs, the first conical velocity diffuser being aligned with the center axis and comprising at least one wall member having a plurality of openings extending therethrough, the first conical velocity diffuser diverging radially away from the center axis as the first conical velocity diffuser extends in a first direction along the center axis; and a second conical velocity diffuser being fixed in position within the cavity of the housing via the ribs, the second conical velocity diffuser being aligned with the center axis and comprising at least one wall member having a plurality of openings extending therethrough, the second conical velocity diffuser converging radially toward the center axis as the second conical velocity diffuser extends in the first direction.

16. A valve in accordance with claim 15 wherein the valve further comprises a velocity shredder that is supported within the cavity of the housing via the ribs, and the velocity shredder comprises at least one wall member that has a plurality of openings extending therethrough.

17. A valve in accordance with claim 16 wherein the velocity shredder is positioned between the conduit and the first and second conical velocity diffusers.

18. A valve in accordance with claim 17 wherein the velocity shredder is cylindrical and is aligned with the center axis.

* * * * *